(12) United States Patent
Shaw et al.

(10) Patent No.: US 8,390,864 B2
(45) Date of Patent: Mar. 5, 2013

(54) PRINT MANAGEMENT SYSTEM FOR RETAINING DOCUMENTS WITH MULTIPLE USERS IDENTIFICATIONS

(75) Inventors: Geoffrey Howard Shaw, Webster, NY (US); Paul van Wichen, Webster, NY (US)

(73) Assignee: Pharos Systems International, Inc. DE (US)

( * ) Notice: Subject to any disclaimer, the term of this patent is extended or adjusted under 35 U.S.C. 154(b) by 0 days.

(21) Appl. No.: 13/442,095

(22) Filed: Apr. 9, 2012

(65) Prior Publication Data

US 2012/0218600 A1 Aug. 30, 2012

Related U.S. Application Data

(63) Continuation of application No. 12/167,014, filed on Jul. 2, 2008, now Pat. No. 8,154,752.

(51) Int. Cl.
| | |
|---|---|
| H04N 1/00 | (2006.01) |
| G06F 3/12 | (2006.01) |
| G06K 15/00 | (2006.01) |
| G06F 15/16 | (2006.01) |
| G06F 15/167 | (2006.01) |

(52) U.S. Cl. ..... 358/1.15; 358/403; 358/1.13; 358/1.14; 358/1.16; 709/203; 709/214; 709/216; 709/231; 709/232

(58) Field of Classification Search ............... None
See application file for complete search history.

(56) References Cited

U.S. PATENT DOCUMENTS

| | | | |
|---|---|---|---|
| 5,559,933 | A | 9/1996 | Boswell |
| 6,859,832 | B1 | 2/2005 | Gecht et al. |
| 7,321,437 | B2 | 1/2008 | Parry |
| 2003/0063309 | A1* | 4/2003 | Parry ............... 358/1.15 |
| 2003/0206311 | A1 | 11/2003 | Konsella et al. |
| 2004/0093410 | A1 | 5/2004 | Reddy et al. |
| 2005/0174609 | A1 | 8/2005 | Thurlow |
| 2005/0289356 | A1 | 12/2005 | Shoham |
| 2006/0275066 | A1 | 12/2006 | Mima |
| 2007/0168514 | A1 | 7/2007 | Cocotis et al. |

FOREIGN PATENT DOCUMENTS

| | | |
|---|---|---|
| EP | 0935182 | 8/1999 |
| EP | 1489488 | 12/2004 |
| WO | 0233532 | 4/2002 |

* cited by examiner

*Primary Examiner* — Benny Q Tieu
*Assistant Examiner* — Haris Sabah
(74) *Attorney, Agent, or Firm* — Allen, Dyer, Doppelt, Milbrath & Gilchrist, P.A.

(57) ABSTRACT

A print management system may include at least one client device for generating print jobs, and a plurality of print servers for storing print job information based upon the generated print jobs. The print servers may cooperate to share the print job information therebetween. At least one printing station may retrieve the shared print job information, and selectively print print jobs based thereon.

13 Claims, 10 Drawing Sheets

PRINT MANAGEMENT SYSTEM FOR RETAINING DOCUMENTS WITH MULTIPLE USERS IDENTIFICATIONS

CROSS-REFERENCE TO RELATED APPLICATION

This application claims the benefit of U.S. Provisional Application Ser. No. 60/947,472, filed on Jul. 2, 2007, the contents of which are hereby incorporated by reference in their entirety.

FIELD OF THE INVENTION

The present invention relates to document processing and reproduction systems, and, more particularly, to document print management systems and related methods.

BACKGROUND OF THE INVENTION

Printing in a network environment typically involves selecting a network printer from a network computer and directing the printing of a document to the selected printer. The document is sent to the selected printer, where it may wait in a queue behind other documents awaiting printing.

In a variation on this theme, U.S. Pat. No. 6,859,832 describes a system in which documents rendered for printing are maintained on a print spooler. A print polling device may remotely access the print spooler. Under certain circumstances, the print polling device can receive documents from the spooler for printing on a printer connected with the polling device.

Many modern networks feature combinations of local area networks (LANs) connected by one or more wide area networks (WANs). Such networks often feature multiple print servers, each of which may be associated with multiple printers, computer, workstations and the like. In such a network environment, systems such as the one described above may not provide desired capabilities or operational flexibility.

SUMMARY OF THE INVENTION

In view of the foregoing background, it is therefore an object of the present invention to provide an improved print management system and related methods.

This and other objects, features, and advantages are provided by a print management system which may include at least one client device for generating print jobs, and a plurality of print servers for storing print job information based upon the generated print jobs. The print servers may cooperate to share the print job information therebetween. At least one printing station may retrieve the shared print job information, and selectively prints print jobs based thereon.

According to an aspect of the present invention, the print jobs may be associated with a plurality of users, and the at least one printing station may retrieve shared print job information for at least one selected user.

According to a further aspect of the present invention, the system may further include a user interface, and a plurality of local area networks (LANs). The at least one printing station may retrieve the shared print job information based upon user input received by said user interface. The print servers may be associated with respective LANs, for example.

A print management method aspect may include generating a plurality of print jobs, storing print job information based upon the generated print jobs on at least one of a plurality of print servers, and sharing the print job information between the plurality of servers. The print job information may be communicated to at least one print station, and selectively printed based on the communicated print job information.

DETAILED DESCRIPTION OF THE PREFERRED EMBODIMENTS

The present invention will now be described more fully hereinafter with reference to the accompanying drawings, in which preferred embodiments of the invention are shown. This invention may, however be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
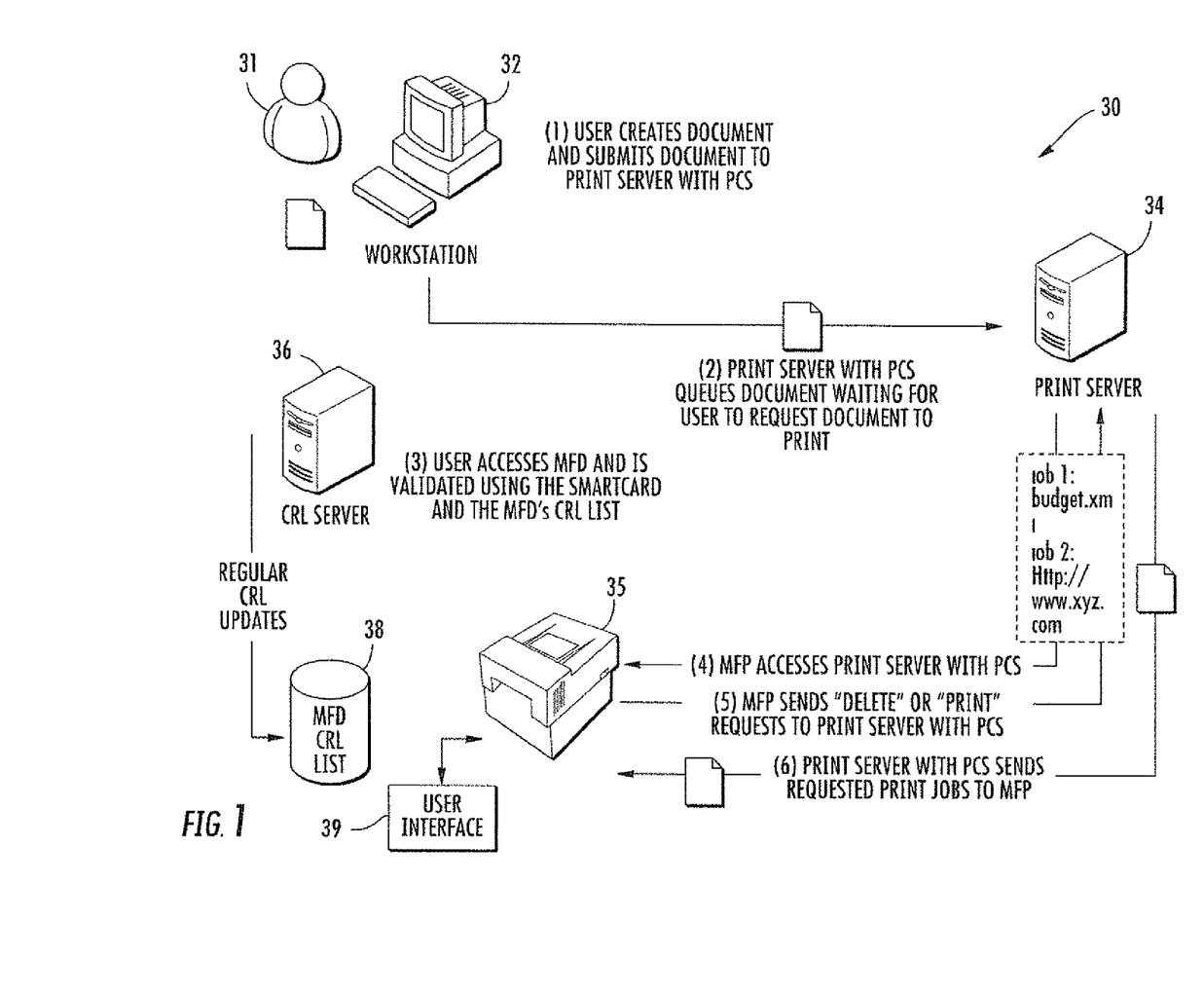
FIG. 1 is a flow diagram of an MFD-based CRL list authentication operation in accordance with the invention.
Figure 2:
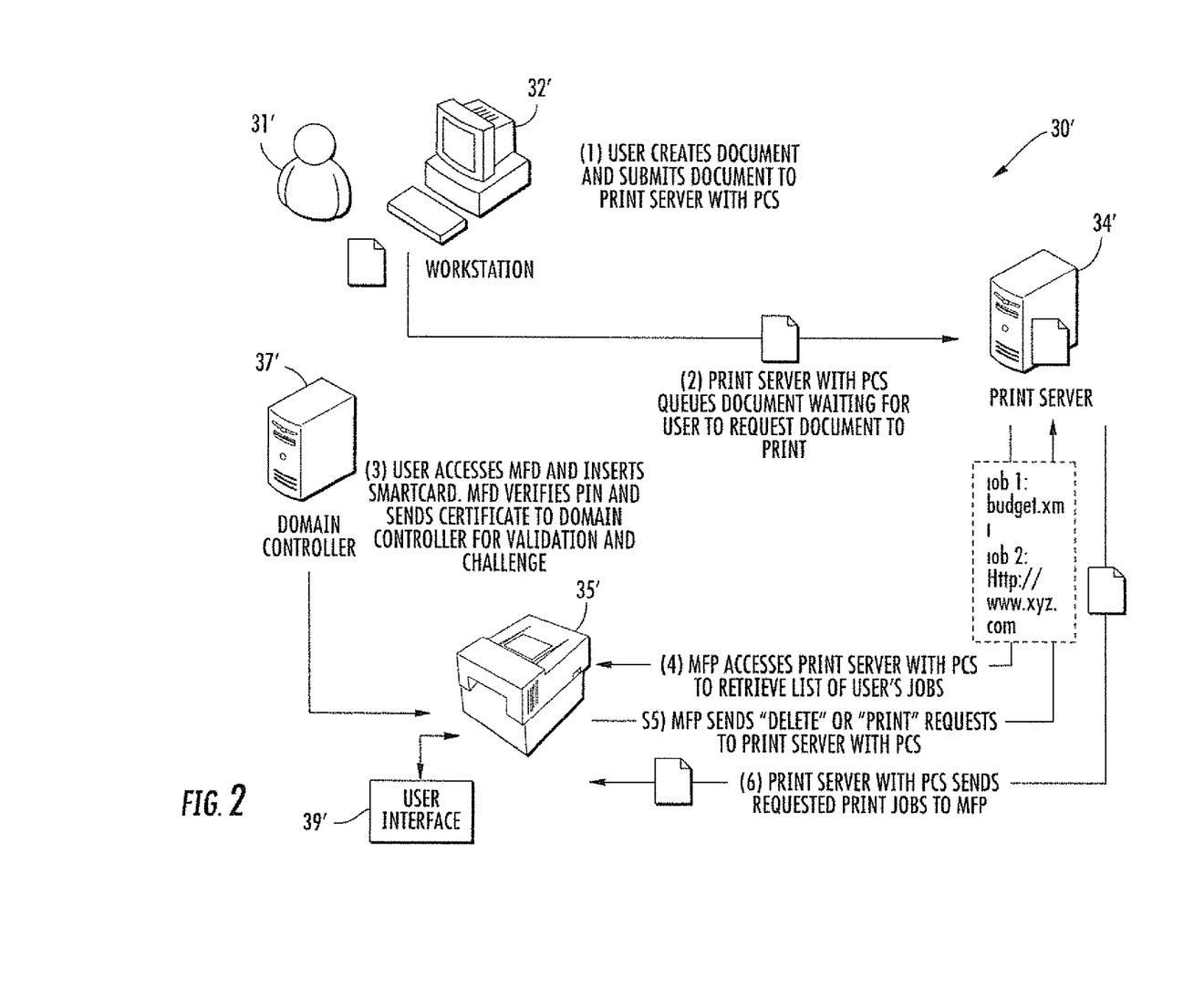
FIG. 2 is a flow diagram of domain controller authentication process in accordance with the invention.

Referring initially to FIGS. 1 and 2, a print management system 30 is described herein in which users 31 generate print jobs from client devices 32, such as a computer/workstation (e.g., a personal computer (PC)) connected together in a local area network(s) 51 (see FIG. 6), and the jobs are stored in a queue (e.g., on a network print sever, a Web/Internet server, or a local computer/workstation), file system, or other media retention system, until the user properly identifies himself at a printing station 35 connected to the network to initiate printing of the job. As used herein, "print job" is not limited to a particular electronic format, such a bitmap, but can include any suitable format including PDF, word processor formats, rich text (RTF), etc., as will be appreciated by those skilled in the art.

In accordance with one example referred to herein as the "Print here" system, users 31 are authenticated through a user interface 39 associated with a printing station 35 (e.g., a printer, multi-function device (MFD), fax machine, etc.) for the Print here function. The user 31 selects a function from the printing station 35. The user identifies himself with an identity token (e.g., a smart card 40 (FIG. 3) inserted in a smart card reader, or other interfacing system), or may be prompted to do so. Once the identity token is detected, the user may be prompted for a personal identification number (PIN) associated with the user. The PIN may be verified with the token. After the PIN is verified, a certificate for the user 31 may be retrieved from the token. Of course, it should be noted that other security measures and/or combinations thereof may be used instead of or with a security token and PIN, such as biometrics (e.g., fingerprints, retinal scans, voiceprints, etc.).

There are various ways the certificate may be validated. One is an active directory authentication method, which is illustrated in FIG. 2. Here, the MFD will use public key cryptography (or other suitable cryptography algorithms) for initial authentication in the Kerberos (PKINIT) protocol. In this protocol, the user's certificate is sent to a domain controller 37' where it is verified with a root Certificate Authority (CA) certificate revocation list (CRL). Furthermore, the domain controller 37' issues a challenge to the MFD 35', and the MFD generates a response using the smart card. The domain controller 37' tells the MFD 35' if the user 31' is authenticated.

An alternative authentication method is MFD authentication. Here, the MFD 35 will include the root CA certificate. This will be used to verify that the certificate on the smart card, etc. was signed by an issuing or authentic source. The MFD will periodically retrieve a CRL from a CRL server 36. The CRL will be used to make sure the certificate has not been revoked by the issuer/authentication source. The MFD 35 then issues a challenge to the security token to verify the certificate actually belongs to the card. An MFD CRL list may be stored in a database 38, for example.

After the certificate is validated, the personal identification (PID) is retrieved from the certificate's subject domain name (subjectDN). By way of example, the PID may be a user name (e.g., jsmith), etc., that is recognized by a particular domain or network. For Print here, the PID can be used to identify the user to a Pharos central print server 50 (FIG. 3) so the user's jobs can be printed or deleted. The systems 30, 30' may use IP security (IPsec), as will be appreciated by those skilled in the art. This will provide secure transmission between all of the devices using industry standard encryption algorithms, for example. The MFD-based CRL list authentication process flow is shown in FIG. 1. Moreover, domain controller authentication is illustrated in the process flow of FIG. 2.

Users may send a print job to their Print here queue on their local print server and then collect their print job from different MFD machines connected to the network IT Platform. If multiple print servers 34 are used in the system, as will be discussed further below, a user 31 will be able to print to any one of those servers and still collect those print jobs from another print station 35 in the system, even at different locations or sites that are connected by the Web/Internet, other wide area network (WAN), etc. The user interface 39 associated with the print station allows the user 31 to manage his currently open print jobs. They can delete print jobs that are not required or print individual jobs or all jobs, and optionally change print attributes, for example.

Moreover, an administrator may centrally set the length of time print jobs are maintained before they are deleted from the print servers 34. It is possible to create a uniform image for each of the network print servers in use for remote management. The Print here system may be implemented in a flexible architecture that can be expanded to control additional MFD functions if necessary.

Print here jobs may also be held local to the user's location. Jobs will only be sent across the network from the print servers 34 directly to the selected print devices when a user 31 requests a job printed using the Print here function on the MFD, potentially reducing the amount of network traffic required. The Print here central serve function can be expanded to support user-based tracking of output, if desired. Use of the Print here system may also encourage users to delete unnecessary jobs before they are committed to hardcopy, saving time and reducing the cost of wasted output.

The system 30 provides redundant reliability so that end users 31 will have access to pick up their printing from a different number of network devices, creating output redundancy around inoperative output devices. The Pharos Print here central server 50 supports active/passive clustering to handle failover. Alternately, other failover handling techniques, such as virtual systems, could be employed. Additionally, the system design has redundancy built into it to reduce and eliminate single points of failure. Thus, the system is designed to "degrade gracefully" in the event of multiple server loss, preserving local queue printing even if remote network links are interrupted.

For additional security and privacy, printing to the central queue may, be requested and made available through authentication, if desired. Thus, print jobs will not be openly available at network printers, providing improved security and privacy for printed documents.

Figure 3:
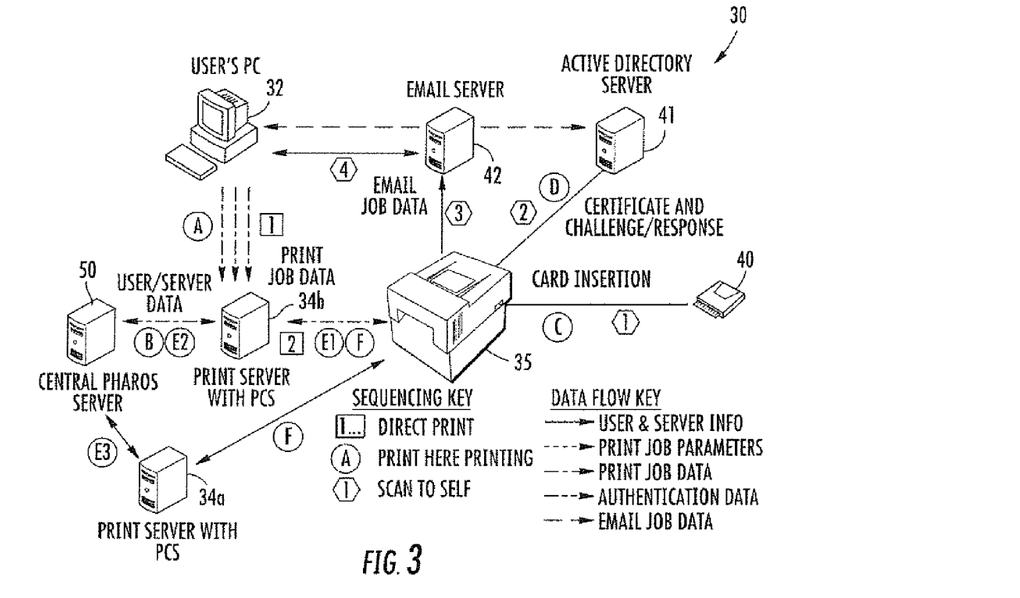
FIG. 3 is a schematic diagram of a print management system in accordance with the present invention.

Additional process/architecture details and examples will now be described with reference to FIG. 3. Each user 31 may automatically be added to the Pharos database, which may be maintained at the print server(s) 34 and/or central server 50, for example, at the time of first usage using the PID passed to Pharos during the token (i.e., smart card) authentication. The PID will be used as the user's ID, and any required configuration will be performed when the user is created in the Pharos database, or when user information is refreshed or updated. If additional user information is required for the user configuration, then a query to an active directory server 41 can be made to gather this information. This process typically need only occur after the first time a user is authenticated, and the authentication occurs before the PID is passed to the Pharos database. No authentication need be performed by the Pharos database other than to ensure that a user with the appropriate PID exists in the database, although further authentication may be possible in some embodiments.

In accordance with one exemplary embodiment, on each network print server 34 a Pharos collector service (PCS) is installed (e.g., a software application). However, the PCS need not be installed on print servers 34 in all embodiments, i.e., it could be installed on one or more client workstations 32 or other computers connected to the network, for example. By way of example, the PCS service may perform one or more of the following tasks:

(1) Operating as an agent that collects information on jobs for redirection. This service collects and stores information about the user and where jobs are stored at the time of job print submission;

(2) Contacting the Pharos central server/database 50 and relaying user and server information to the Pharos central server about a user job submission;

(3) Querying the Pharos central server 50 for user information when prompted by an MFD it services;

(4). Querying "peer" servers about jobs found to contain jobs for the requesting user and stores it on a local cache; and (5) Requesting "peer" servers to release jobs to a particular MFD.

It should also be noted that by installing PCS on local client workstations 32, the need for a centralized print queue may be reduced or eliminated in some embodiments. That is, a central PCS for a given local network (which could be on a workstation or server) may keep track of the pending print jobs for users in that locale and where those jobs are stored. The central PCS could therefore manage the print process, and also communicate with other central PCS' from remote networks, to print documents from local client workstations 32 directly to a given MFD when the user presents himself there for authentication to initiate the printing process, and without requiring a central storage area for spooled print files.

The Pharos Print here solution may be based on a multi-tier architecture that leverages desired results for a majority of print transactions by keeping the print jobs local to a user's location. Jobs are sent across the network from the print servers 34 directly to the selected print devices when a user submits a job to print using the Print here function on the MFD. This may advantageously reduce network traffic, as noted above. For security and optimization purposes, print jobs may also be transmitted through alternate paths and print servers.

A variety of scenarios that users may encounter when using the Print here system are shown in the process flow diagrams of FIGS. 4-7. These figures demonstrate the capabilities of Print here in a variety of circumstances. The standard Windows client print processes and print drivers advantageously need not be replaced nor altered, thus allowing support to be maintained and standard OEM drivers and print processes to function as designed.

The local versus global architecture is transparent to the user, so additional training typically need not be offered for traveling users, for example. Should there be a WAN failure with the Pharos central server 50, local users can still advantageously print and retrieve jobs on the local print server. Actions in each of the Print here diagrams are numbered and described by sequential numbering for each action. It will appreciated that the present invention is not necessarily limited to the enumerated operations or the order thereof.

When a print server with PCS receives a job, user information and print server information are stored in a local database and formatted in a small packet then forwarded to the Pharos central server, for example. The Pharos central server 50 adds that information to a company-wide database. When a user initiates the retrieval process at an MFD, the local print server 34 is queried and the query is rebroadcast to the Pharos central server 50. If the Pharos central server 50 is available, a query will be processed by the central server looking for the discrete user 31. Should the user be found, a list of servers 34 will be returned to the requesting server. This information is cached at the requesting server. The requesting local server 34 will then query "peer" servers for the lists of job names on each to build the print list at the MFD. If the Pharos central server 50 is not be available subsequent to the query, and the user requests a release of jobs from an MFD serviced by that print server 34, jobs residing on "peer" print servers will still be retrieved. This architecture may advantageously provide a "higher uptime" benefit than many other print distribution systems.

Figure 4:
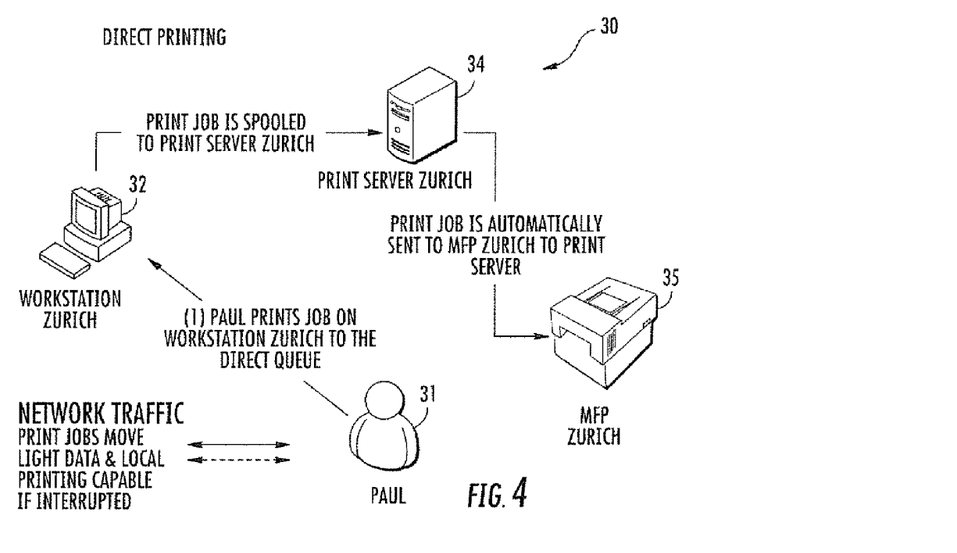
FIG. 4 is a flow diagram of a typical prior art print process.
Figure 5:
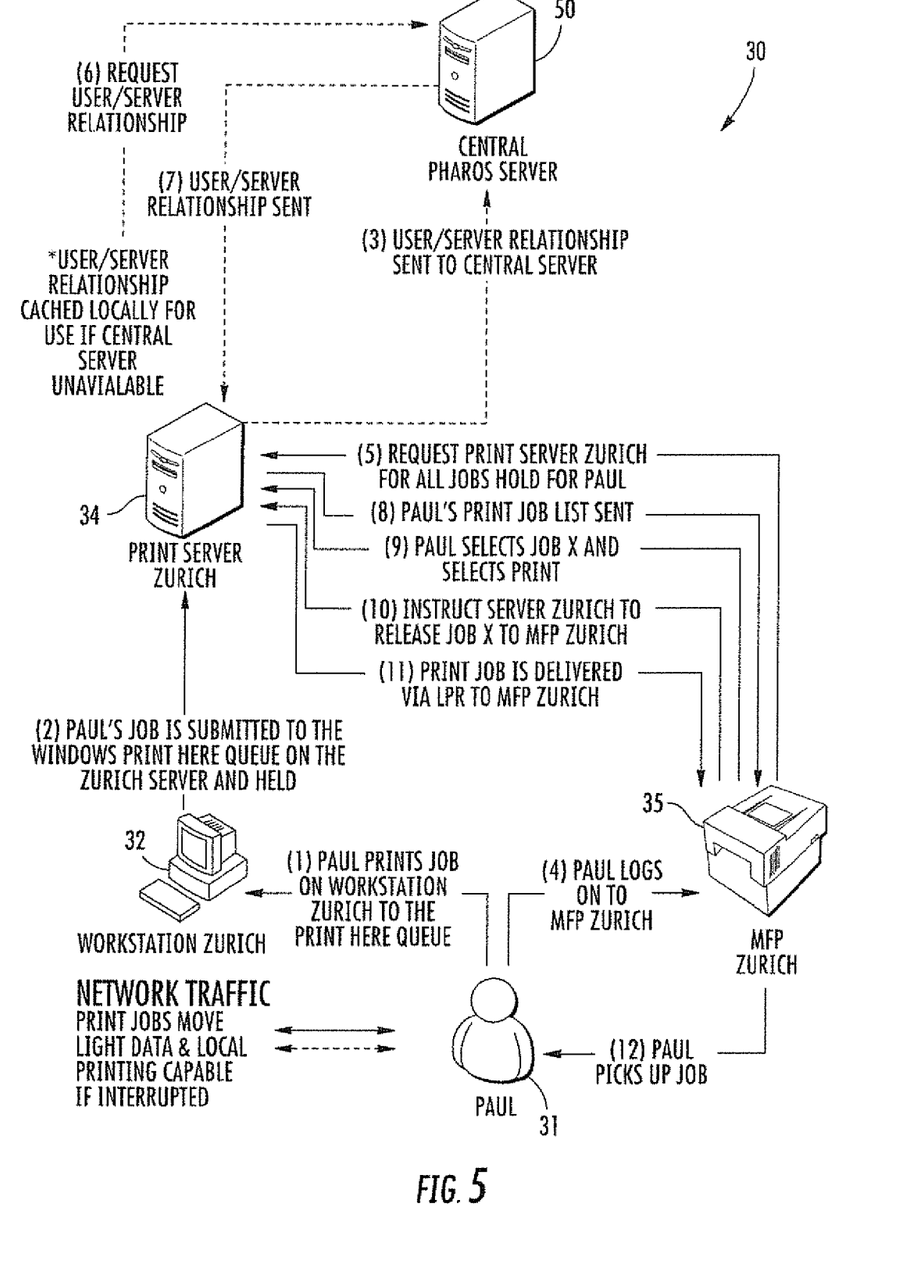
FIG. 5 is a flow diagram of a print process requiring user authentication at a printing station in accordance with the present invention.

In accordance with a first user scenario, a user 31 may print a job using "direct print" functionality in which a user can choose to print his jobs using the Print here function or not. FIG. 4 illustrates a situation for a user who is not using any Print here functions. In a scenario illustrated in FIG. 5, the user authenticates to a workstation 32, picks the Print here print object, and sends a print job to the queue. The user next approaches the MFD 35 and authenticates to the device. A list of jobs held in queue are presented on the LCD screen (not shown) available for release to the MFD 35. The user 31 selects jobs to be printed or deleted on the touch screen and then executes the print release. Any jobs in the local queue are sent via LPR to the MFD 35, for example. This output scenario does not require the Pharos central server 50 for completion. In the event of loss of the Pharos central server connection, the jobs would appear as available for print and be output normally.

Figure 6:
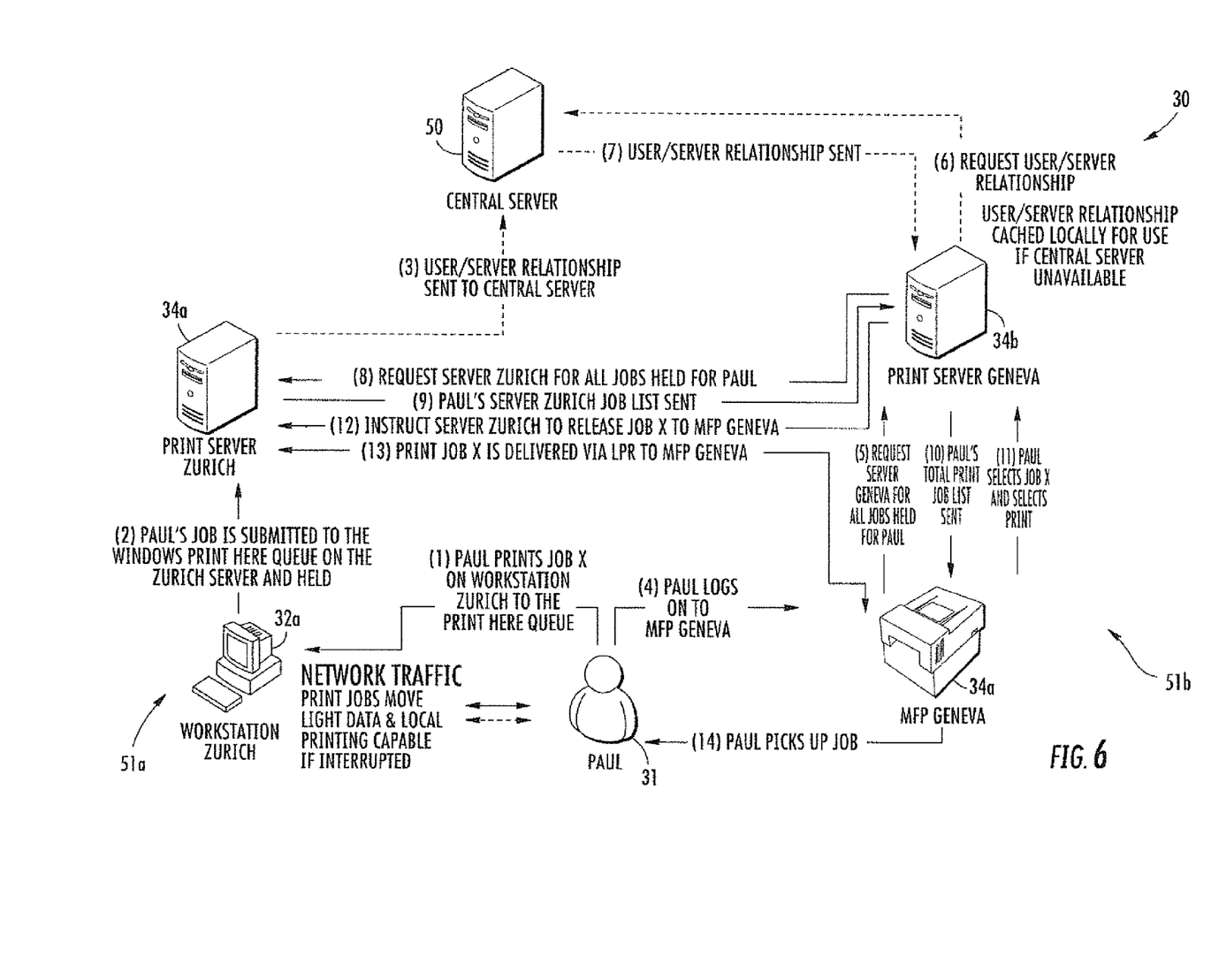
FIG. 6 is a flow diagram of a print process where the user generates a print job from one location and retrieves the print job from a different location in accordance with the present invention.

Turning now additionally to FIG. 6, in the illustrated example a user sends a job for output from one locale and retrieves it at another. This scenario exercises the Pharos central server 50 in a query to find if the user has current jobs in queue and, if so, on what server(s). This information is sent to the remote server 34 for selection and prospective output to hardcopy. In this scenario, users could still print and release local cached remote jobs left on the "Geneva Server" even if the connection is lost with the Pharos central server 50. Additionally, where the "Geneva Server" is configured with the identity of one or more additional print servers; the "Geneva Server" could still query those servers directly.

Figure 7:
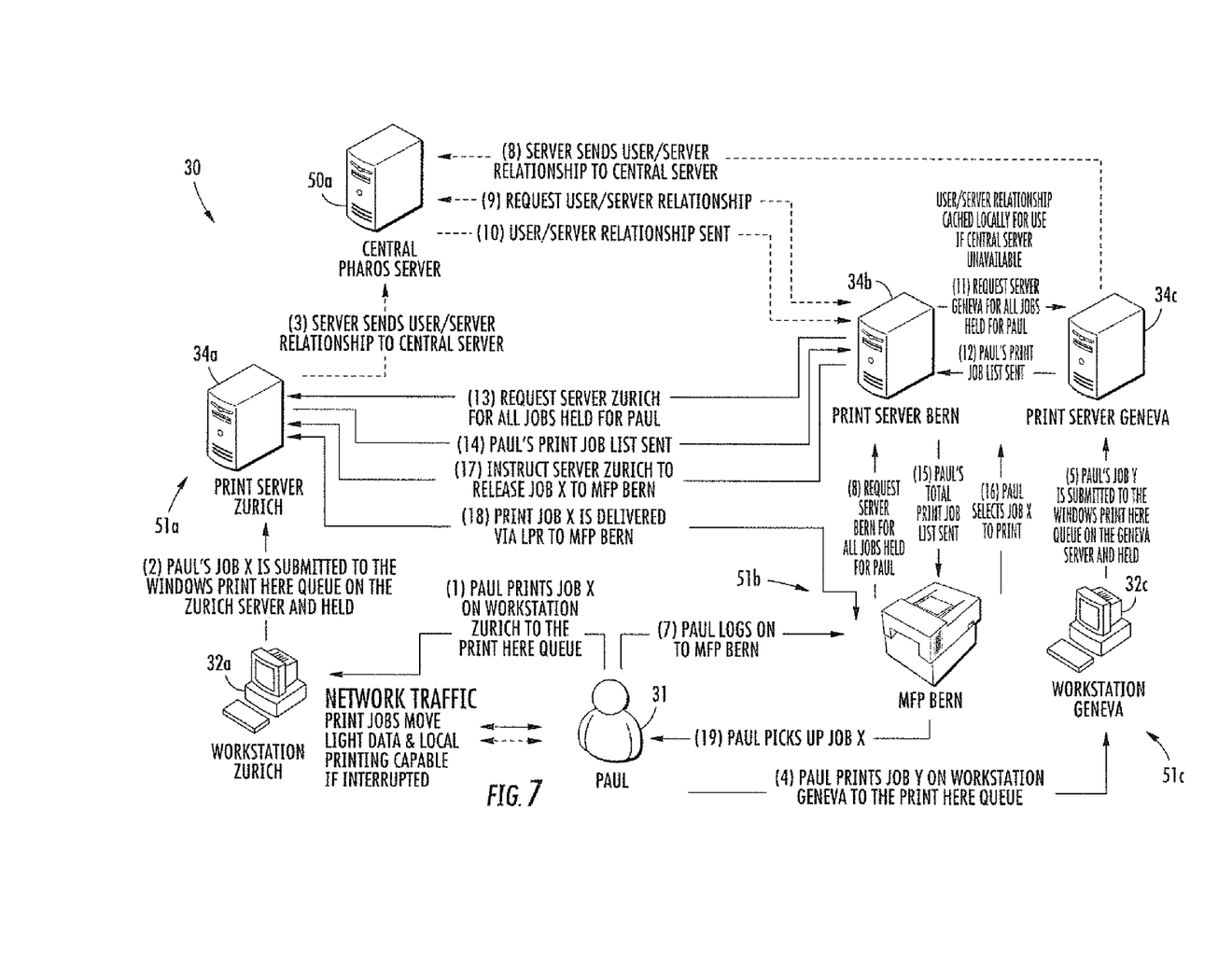
FIG. 7 is a flow diagram of a print process where the user generates print jobs from a plurality of different locations and retrieves the print job from one or more locations.

Referring additionally to FIG. 7, another exemplary scenario illustrates the ability of the Pharos Print here system to be bandwidth efficient, prompt in action and scalable in a given network environment. In the present example, a mobile user 31 has submitted jobs to print servers 34a, 34c in two different locales and is asking the system 30 to locate and retrieve them from a third locale. Beyond the traveling example, this scenario may also be useful in a large office or campus environment, for example.

It should be noted that in the examples of FIGS. 6 and 7, is it possible in, some implementations that a user may have more than one PID, i.e., a user may have a respective PID for each of the different network environments (i.e., Zurich, Geneva, etc.). In such case, the central Pharos server 50 may advantageously reconcile the PIDs to allow user access to documents, etc., on either network. One way in which this can be accomplished is by maintaining the PIDs associated with a given user in a centralized database, and thus when the user logs in to one network with the PID for that network the central Pharos server 50 can automatically use the corresponding PID for the remote network the user wishes to access. If greater security is desired, the central Pharos server 50 may equate the user PID from one network with that of another network, but require the user to also provide the proper PID and/or password, etc. for the remote network to access documents or other information stored thereon. Other approaches for reconciling different PIDs for a same user similar to those described above may also be used, as will be appreciated by those skilled in the art.

Figure 8:
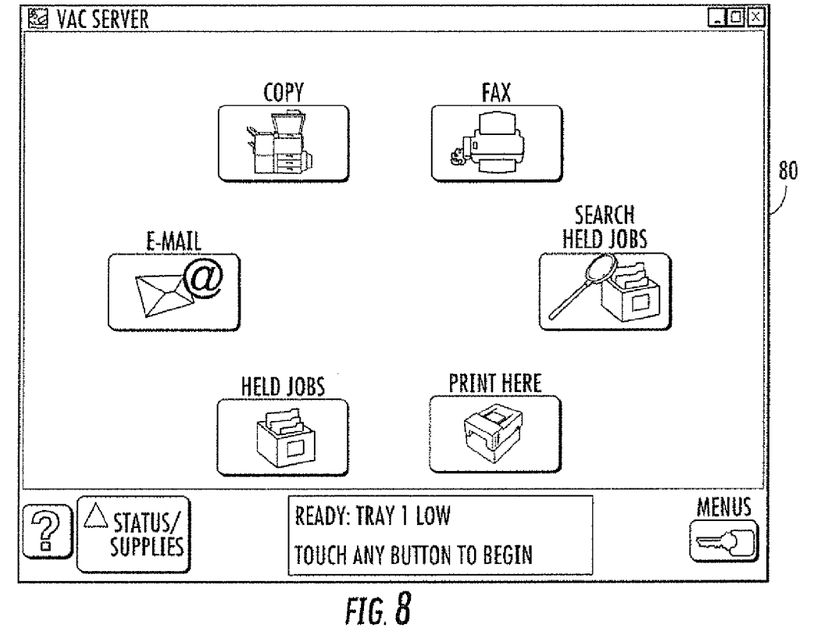
FIGS. 8-10 are screen prints illustrating the user document retrieval process at a user interface associated with a printing station in accordance with the present invention.
Figure 9:
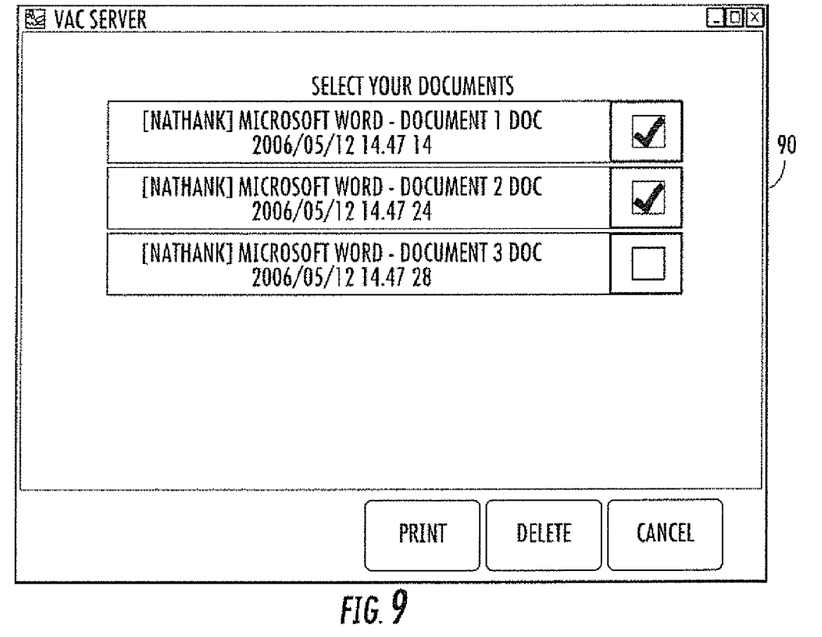
Figure 10:
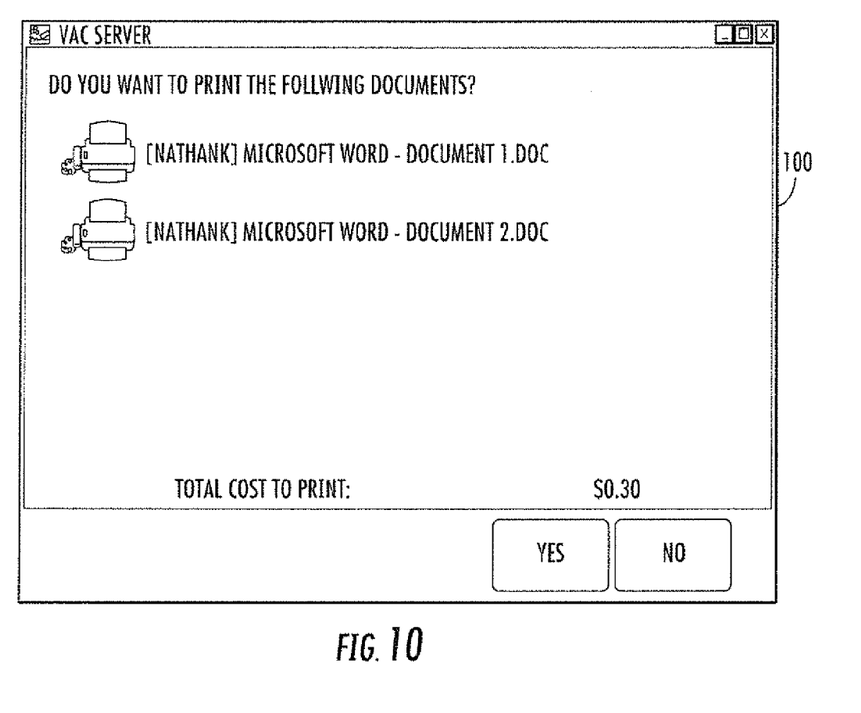
Figure 11:
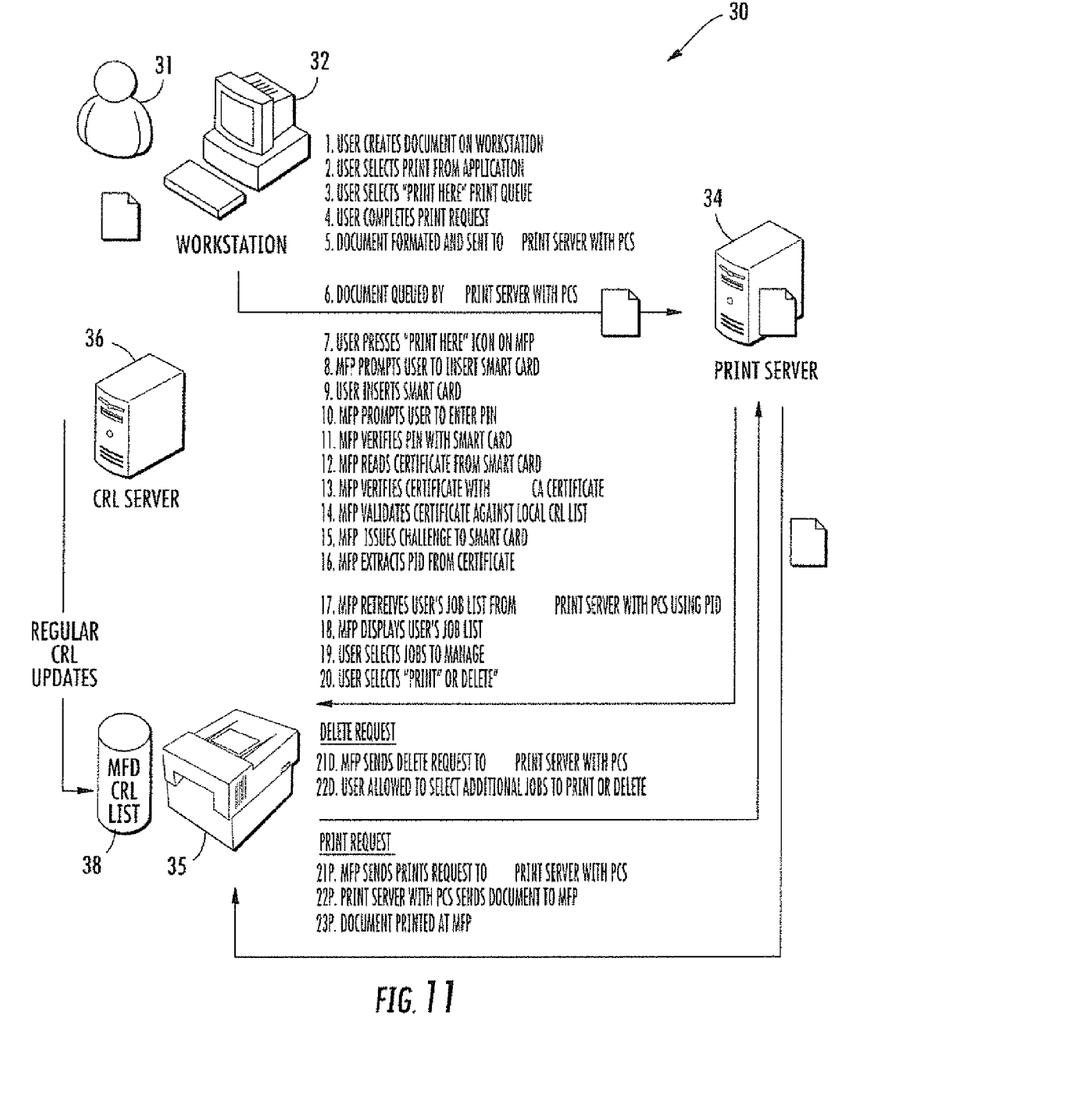
FIG. 11 is a flow diagram of the MFD-based CRL list authentication operation in greater detail.
Figure 12:
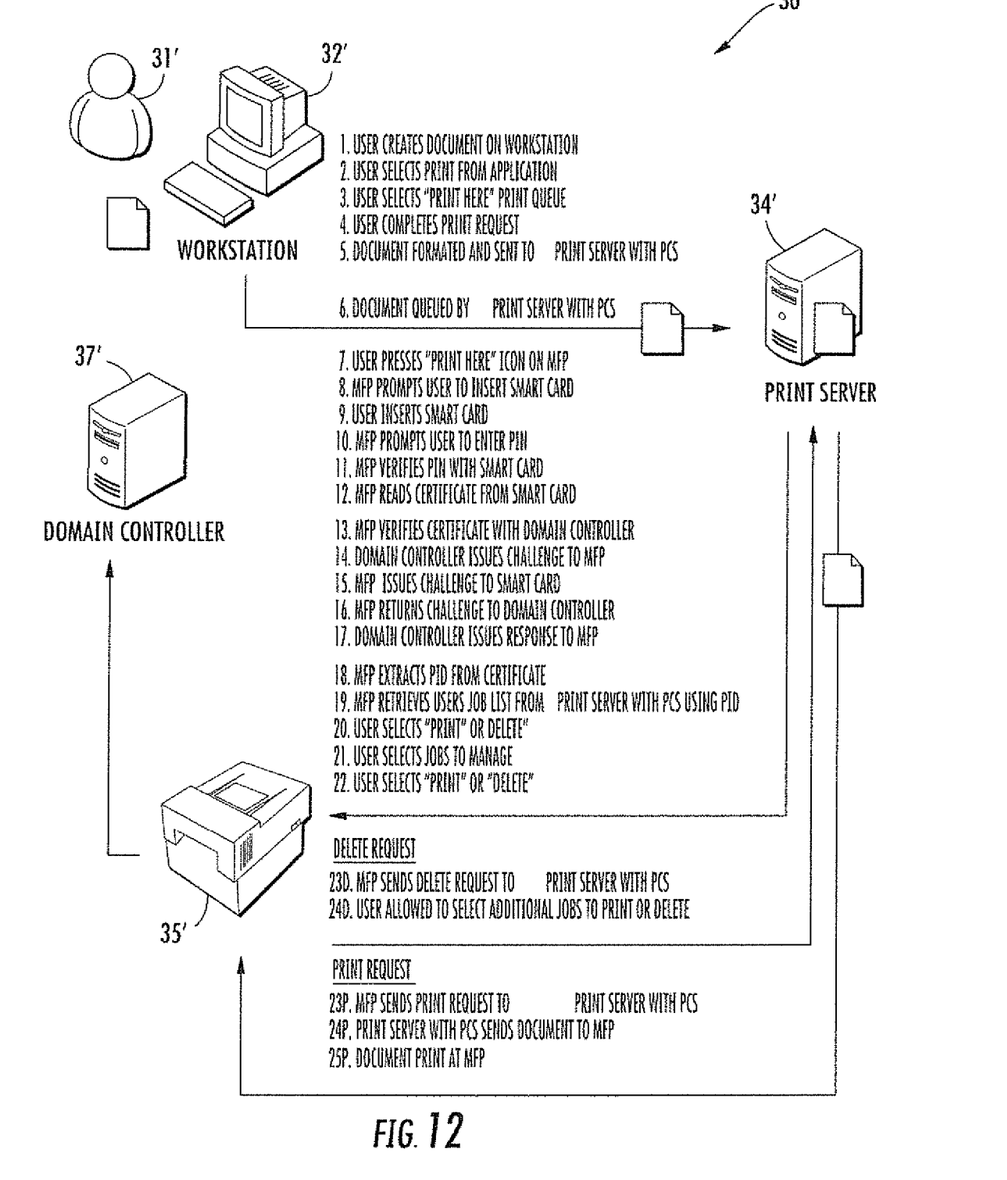
FIG. 12 is a flow diagram of the domain controller authentication process of FIG. 2 in greater detail.

Turning now additionally to FIGS. 8-10 and schematic screen prints 80, 90, 100 respectively shown therein, usability aspects of the Print here system are now described. To use the Print here function, a user will first print his document to the Print here queue. Then he will go to the MFD 35 of his choice and press the Print here button (FIG. 8) on an associated user interface (for example, an interface integral with the MFD). The Print here application will perform the smart card authentication described above. After the user is authenticated, the user is shown a list of his print jobs (FIG. 9). The user can select any number of available documents/jobs and either print or delete them. The application can be configured to confirm the user's request, if desired. If the user confirms that he wants to print the document(s), the document(s) will begin printing on the MFD 35 and optionally be removed from the Print here server. If the user confirms that he wants to delete one or more documents, the document(s) will also be removed from the Print here server. Detailed authentication flow charts for Print here MFD-based CRL list authentication and active directory authentication processes are respectively provided in FIGS. 11 and 12.

To provide additional security, selected network printers may be tagged as secure release printers. For example, these may be printers having a Pharos OMEGA unit attached thereto, or that have an on-board or interface feature/hardware for the end user authentication, and also to select the print job from a list or where the print job has been marked to be released when sent to this printer. The print jobs can be held or managed from a number of locations, for instance the print server print queue, from a directory or storage location held on the local computer/workstation, on a server or the computer where the print job was created, or from any other computers or computer in communication with the network. The Pharos collectors (or single collector) may track information about the print file, including specific information about who created the print file, when the print file was created, where the print file is held and can be accessed, under what conditions the print file can be collected or a request given to forward the print file to a particular location or printer, as well as the attributes of the print job which again may include output options, number of pages and color content, etc.

The originator of the print job (i.e., the user creating the print job) can provide the release options for the particular print job at his/her work station, remotely from other peripheral devices with access to the network, from a server, and/or the print job can assume "default" release options that are determined by an administrator from an administrator application where rules or actions are described for the release of the print job. One example is that a print job may designated for a specific purpose of moving the print file or releasing the print file to an output device for the output device to perform a particular function specific to that device, e.g., printing, storage, file archive, etc. Where the user requesting access to the print file must be authenticated (e.g., security token, PIN, etc.), the authentication of a third person (e.g., an administrator or, security officer) may optionally be required before a particular print job is released. The access rules may be advantageously change or be adapted over time, or operate differently during different time periods. For example, a second person may not be required for a print job to be released between certain hours of the day, on certain days, or before a specified date, etc.

The system 30 may also track who has gained access to a particular print job and what action was taken, e.g., file was printed, etc. Moreover, print jobs may be encrypted at the time of creation and decrypted when delivered to the output device, for example, as noted above.

In accordance with another advantageous aspect, a software application may reside on a local computer that monitors all the print queues on a plurality of print servers 34. The software application may be centrally configured to show certain information about the print queues, print servers 34 and print server queues. For example, this information can extend to all print jobs, or only those print jobs released by the given user at the local computer. The filtered information can be determined by an administrator or the local user, where the local user will preferably only be able to access a subset of the available information to a user with administration rights (i.e., the administrator(s)).

A user 31 or administrator may determine what can be done to the jobs held in the print queues, on a print server 34, or in other repository systems, which may extend from an explicit data base management application down to a simple file administration system. For example, a user 31 may choose to delete his print jobs or release them for printing. A user 31 or administrator may also elect to change certain aspects of the print job, e.g., change the output from color to black and white or the finishing option from simplex to duplex, etc. The software application may make available to the user or administrator information about the chosen or default finishing option of the print job, and the user/administrator may view the final output of the print job and make changes to this print job. The software application may also have server components or peer-to-peer communication to others of the same or similar applications that may communicate the same or similar application information about the print job and where this information may be expanded upon or limited. For example, this may include filtering, depending on the user requesting the information, the classification of the individual (e.g., the department he/she works in), and the security level of the user seeking the given information.

A user or administrator may also determine what printer/MFD the print job can be released to, and what the finishing will be for the print job for a particular printer or group of printers. These options may change by user, user permission, printers, copiers, or other output devices, time of day, occasion or any other events, for example. For instance, a user may select certain print jobs for release at a printer or multifunction device or other output devices from this application, and the user presents his/her identification data using a proximity reader to initiate printing. A typical scenario would be a proximity reader coupled to an MFD 35, and a user presents his/her personal identification token (e.g., personal area network (PAN) device, smart card, etc.) at the reader associated with the output device, and all print jobs the user tagged for release will be sent to that output device. The user may optionally be provided with the opportunity to select which jobs from the pending list to print, rather than automatically print all of the pending jobs.

Yet another example is where the user tags, from the local application, select print jobs for release in select time frames only, or by time frames and select printers. For example, a user may tag a print job held in a file system that will be sent to a printer that has duplex output capability, and only if the request is made between the hours of 3 pm and 4 pm. However, other jobs may be released under the same conditions but at any time after 5 pm if the user identifies himself as being physically present at the output device or printer. The physical determination can be made by the user applying his/her security/identification token, PIN, etc., as discussed further above.

The identification device will typically be positioned on or in close proximity to the output device or printer. The output device is associated with the identification device, and this association can be determined in various ways. For example, a wireless "fingerprint" or signature signal of the identification device can be coupled, associated or otherwise matched with that of the output device. Moreover, the devices may be located by various approaches using hardwired connections, radio frequency (RF) and/or infrared (IR) connections, wireless networks (802.11x, Bluetooth, etc.) links, satellite positioning signals (e.g., GPS, etc.), cellular telephone links, etc.

By way of example, a user could release a job from his/her local computer 32 to a repository or a print queue on the Web/Internet. The user may tag (running the application on the local computer or over the Web/Internet, for example) select print jobs so that these print jobs are forwarded to a printer or other output device at a location that will be visited by the user or other users who are given rights or permission to gain access to this print job. For example, a user who has delivered a print job to the Web repository may send a code to a friend who can then visit a store, copy services center, etc., and print the document.

Moreover, the user (or other designated person) could use his/her cell phone, PDA, or other electronic device as a user interface to release the print job at the printer through an email/text message interface, Web browser, etc. For example, the user could log onto the Web repository, select a pending print job, and then designate alternate users that have permission to print the job (which could be done by user IDs, etc.). Numerous types of documents and data can be printed in this way, including text documents, PDF files, image files (i.e., pictures), subscription data (e.g., electronic newspapers, books, articles, etc.). Another option is that users can exchange a code, an electronic security token, etc., by email, wireless link between handheld devices (e.g., Bluetooth link, etc.), etc., that provides access to print a given document.

In accordance with another example, once a user has submitted a print job to the Web repository, the user could use his/her cell phone to release the print job to a friend's printer at the friend's home (or elsewhere). Furthermore, a guest at a hotel could use his/her cell phone or other electronic device to forward tagged (or untagged) print jobs from a remote computer connected to the Web/Internet, a print server, etc., to a hotel printer. The hotel could also charge the quest for the printer usage. In this scenario, the system has knowledge of the user, the user print job, the print jobs output requirements, the hotel's printer output capability, the hotel printer location, etc. Furthermore, it can place into the hotel system knowledge of the print transaction for the purposes of charging the hotel guest, visitor or casual passer by who wishes to use the printer. In this scenario, a user may be able to gain access to a map or listing of all printers at the hotel (or in another type of business/facility) through the Web/Internet, and select the desired device for printing.

Additionally, the present invention is not necessarily limited to print jobs generated by computers/workstations 32. For instance, print jobs can also be generated based on received facsimiles or emails. In a further example, emails and their respective attachments are received by an email server 42 associated with the print management system 30. In addition to communicating the emails and attachments to computers/workstations, handheld devices (such as PDAs and cellphones) and other devices, the emails and/or attachments are stored at a designated location with identifying information, such as sender and recipient names and email contents.

When a user accesses a user interface at a printing station, the user is allowed to view a list of emails and/or attachments with identifying information and can select one or more emails and/or attachments for printing. Upon selection, the printing station 35 retrieves the emails and/or attachments from the designated location for printing. A similar operation can also be performed with facsimiles or with documents from other sources.

Also, one or more designated Print here email addresses can be established and associated with respective users or groups of users 31. Emails sent to such as addresses and/or their attachments are stored at the designated location and can be retrieved for printing at print stations 35 accessed by the associated users 31. Permissions can be attached to the emails and/or attachments such that some users 31 associated with a given Print here email address may not be able to print all emails and/or attachments, for example, if desired.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A document management system comprising:
   at least one client device for generating output jobs associated with a plurality of users;
   a plurality of document servers for storing spooled data sets based upon the generated output jobs, wherein spooled data sets for at least one selected user stored on different document servers have different user identifications (IDs) associated therewith, and wherein said document servers cooperate to reconcile the different user IDs to share the spooled data sets therebetween; and
   at least one output device for selectively retrieving and outputting the shared spooled data sets for the at least one selected user.

2. The system of claim 1 wherein the plurality of document servers comprise at least one central server for coordinating sharing of spooled data sets between the plurality of document servers.

3. The system of claim 1 further comprising a user interface; and wherein said at least one output device retrieves the shared spooled data sets based upon user input received by said user interface.

4. The system of claim 3 wherein said user interface comprises a display for displaying a list of output jobs for user selection.

5. The system of claim 1 further comprising a plurality of local area networks (LANs); and wherein said document servers are associated with respective LANs.

6. The system of claim 1 wherein said at least one output device comprises a plurality of output devices associated with respective document servers.

7. The system of claim 1 wherein said at least one output device comprises at least one multi-function device (MED).

8. The system of claim 1 wherein at least one of said document servers generates output jobs from electronic mail (email) attachments forwarded thereto by said at least one client device.

9. A document management system comprising:
   a plurality of local area networks (LANs);
   at plurality of client devices associated with respective LANs for generating output jobs associated with a plurality of users;
   a plurality of document servers associated with respective LANs for storing spooled data sets based upon the generated output jobs, wherein spooled data sets for at least one selected user stored on different document servers have different user identifications (IDS) associated therewith, and wherein said document servers cooperate to share the spooled data sets therebetween;
   at least one output device associated with at least one of the LANs for selectively retrieving and outputting the shared print spooled data sets for the at least one selected user; and
   a user interface associated with the at least one output device, wherein said at least output device retrieves the shared spooled data sets based upon user input received by said user interface.

10. The system of claim 9 wherein the plurality of document servers comprise at least one central server for coordinating sharing of spooled data sets between the plurality of document servers.

11. The system of claim 9 wherein at least one of said document servers generates output jobs from electronic mail (email) attachments forwarded thereto by said at least one client device.

12. A document management method comprising:
generating a plurality of output jobs associated with a plurality of users;
storing spooled data sets based upon the generated output jobs on at least one of a plurality of document servers, wherein spooled data sets for at least one selected user stored on different document servers have different user identifications (IDs) associated therewith;
reconciling the different user IDs to share the spooled data sets between the plurality of document servers; and
selectively retrieving and outputting the spooled data sets for the at least one selected user at the at least one output device.

13. The method of claim 12 wherein generating further comprises generating output jobs using at least one of the document servers from email attachments forwarded thereto by the at least one client device.

* * * * *

UNITED STATES PATENT AND TRADEMARK OFFICE
CERTIFICATE OF CORRECTION

| | | |
|---|---|---|
| PATENT NO. | : 8,390,864 B2 | Page 1 of 1 |
| APPLICATION NO. | : 13/442095 | |
| DATED | : March 5, 2013 | |
| INVENTOR(S) | : Shaw et al. | |

It is certified that error appears in the above-identified patent and that said Letters Patent is hereby corrected as shown below:

In the Specifications:

Column 6, Line 30          Delete: "in,"
                           Insert: -- in --

In the Claims:

Column 10, Line 39         Delete: "MED"
                           Insert: -- MFD --

Column 10, Line 53         Delete: "IDS"
                           Insert: -- IDs --

Signed and Sealed this
Thirtieth Day of April, 2013

Teresa Stanek Rea
*Acting Director of the United States Patent and Trademark Office*